US008549481B2

(12) United States Patent
Birsan et al.

(10) Patent No.: US 8,549,481 B2
(45) Date of Patent: Oct. 1, 2013

(54) WEB-BASED INTEGRATED TEST AND DEBUGGING SYSTEM

(75) Inventors: Dorian Birsan, Markham (CA); Mihnea Galeteanu, Markham (CA); Vladimir Klicnik, Markham (CA); Mariya Koshkina, Markham (CA); Wen Sheng Liu, Markham (CA); William Gerald O'Farrell, Markham (CA); Hung Chau Tran, Markham (CA)

(73) Assignee: International Business Machines Corporation, Armonk, NY (US)

( * ) Notice: Subject to any disclaimer, the term of this patent is extended or adjusted under 35 U.S.C. 154(b) by 826 days.

(21) Appl. No.: 12/627,550

(22) Filed: Nov. 30, 2009

(65) Prior Publication Data

US 2011/0067004 A1    Mar. 17, 2011

(30) Foreign Application Priority Data

Sep. 16, 2009 (CA) ...................................... 2679789

(51) Int. Cl.
*G06F 17/50* (2006.01)
*G06F 15/16* (2006.01)
*G06F 15/173* (2006.01)
*G06F 11/00* (2006.01)
*G06F 9/44* (2006.01)

(52) U.S. Cl.
USPC ............. 717/125; 703/13; 709/203; 709/224; 714/31; 717/100; 717/102; 717/115; 717/124; 717/129

(58) Field of Classification Search
None
See application file for complete search history.

(56) References Cited

U.S. PATENT DOCUMENTS

| 6,119,247 | A  | * | 9/2000  | House et al. ............... 714/38.14 |
|-----------|----|---|---------|------------------------------------|
| 6,263,456 | B1 |   | 7/2001  | Boxall et al. |
| 6,442,714 | B1 |   | 8/2002  | Griffin et al. |
| 2002/0066071 | A1 | * | 5/2002  | Tien et al. ...................... 717/102 |
| 2004/0199629 | A1 | * | 10/2004 | Bomer et al. ................. 709/224 |
| 2005/0010678 | A1 | * | 1/2005  | Pugh et al. ..................... 709/232 |
| 2005/0086644 | A1 | * | 4/2005  | Chkodrov et al. ............ 717/124 |
| 2005/0172168 | A1 | * | 8/2005  | Kilian ............................ 714/31 |
| 2005/0257196 | A1 | * | 11/2005 | Hollander et al. ............ 717/115 |

(Continued)

OTHER PUBLICATIONS

Antero Taivalsaari et al., Web Browser as an Application Platform: The Lively Kernel Experience, Jan. 2008, [Retrieved on May 7, 2013]. Retrieved from the internet: <URL: http://dl.acm.org/citation.cfm?id=1698208> 25 Pages (1-25).*

(Continued)

*Primary Examiner* — Don Wong
*Assistant Examiner* — Anibal Rivera
(74) *Attorney, Agent, or Firm* — Cuenot, Forsythe & Kim, LLC (57) ABSTRACT

A computer-implemented method, system, and computer program product for a web-based integrated test and debugging system is provided. The method includes configuring a proxy widget on a server to communicate with a debug widget on a browser, and configuring the proxy widget to communicate with an integrated development environment (IDE) external to the server. The method also includes running a process on the server associated with one or more process-control widgets on the browser. The method further includes polling the IDE via the proxy widget to access a debug and test infrastructure of the IDE for debug data associated with the process, and relaying the debug data associated with the process from the proxy widget to the debug widget to provide web-based integration of testing and debugging on the browser while the process is running on the server.

20 Claims, 4 Drawing Sheets

(56) References Cited

U.S. PATENT DOCUMENTS

| | | |
|---|---|---|
| 2006/0005207 A1* | 1/2006 | Louch et al. .................. 717/100 |
| 2006/0095276 A1* | 5/2006 | Axelrod et al. ................... 705/1 |
| 2007/0067373 A1* | 3/2007 | Higgins et al. ................ 707/206 |
| 2007/0226241 A1* | 9/2007 | Ng et al. ........................ 707/102 |
| 2009/0077091 A1 | 3/2009 | Khen et al. |
| 2009/0132220 A1* | 5/2009 | Chakraborty et al. .......... 703/13 |
| 2009/0164981 A1* | 6/2009 | Heidasch et al. ............. 717/129 |
| 2009/0276431 A1* | 11/2009 | Lind et al. ......................... 707/8 |
| 2010/0106767 A1* | 4/2010 | Livshits et al. ............... 709/203 |

OTHER PUBLICATIONS

William Ryan, Web-Based Java Integrated Development Environment, Feb. 2007, [Retrieved on May 7, 2013]. Retrieved from the internet: <URL: http://www.willryan.co.uk/dissertation.pdf> 83 Pages (1-83).*

Khen, G., "Howto: Create and Run a Simple ASP.NET Application with CodeRun Online IDE," [online] Video Presentation, CodeRunPlatform, YouTube, LLC, Oct. 9, 2009 [retrieved Oct. 8, 2012] available on the Internet at: <http://www.youtube.com/watch?feature=player_detailpage&v=M7fsplbpRGA>, 2 pgs.

* cited by examiner

WEB-BASED INTEGRATED TEST AND DEBUGGING SYSTEM

BACKGROUND

The present invention relates generally to web-based computing, and more specifically, to a web-based integrated test and debugging system using a proxy to combine data and functionality of different widgets in a Rich Internet Application (RIA).

RIAs provide users with easy to use, portable ways to access and control business processes. RIAs typically use a web browser and Web 2.0 technologies, such as Asynchronous JavaScript and XML (AJAX), to present a flexible and responsive user experience where widgets from a variety of sources can be "mashed up" or merged together in a convenient way for the user. A widget is portable code that can be installed and executed within a web page without requiring additional compilation. When developing applications, it may be desirable to perform testing and debugging. Debuggers usually rely on facilities of an Integrated Development Environment (IDE) to communicate with a runtime application, obtain variable values, stop on breakpoints, and the like. Debugging and testing activities are typically performed on a separate platform using a separate environment from an RIA execution environment. Thus, various user interfaces, platforms, and/or environments may be needed to perform testing and debugging of widgets used for business processes.

SUMMARY

An exemplary embodiment is a computer-implemented method for providing a web-based integrated test and debugging system. The method includes configuring a proxy widget on a server to communicate with a debug widget on a browser, and configuring the proxy widget to communicate with an integrated development environment (IDE) external to the server. The method also includes running a process on the server associated with one or more process-control widgets on the browser. The method further includes polling the IDE via the proxy widget to access a debug and test infrastructure of the IDE for debug data associated with the process, and relaying the debug data associated with the process from the proxy widget to the debug widget to provide web-based integration of testing and debugging on the browser while the process is running on the server.

Another exemplary embodiment is a system for web-based integrated testing and debugging. The system includes a host system with a processing circuit in communication with a data storage device configured to store process data. The system also includes a server configured to execute upon the host system and deploy a debug widget to a browser. The debug widget is configured to communicate with one or more process-control widgets on the browser as a mash-up. The system is further configured to run a process on the server associated with the one or more process-control widgets on the browser, where the process accesses the process data. The system is also configured to execute a proxy widget at the server to communicate with the debug widget and an IDE external to the server, where the proxy widget polls the IDE to access a debug and test infrastructure of the IDE for debug data associated with the process. The system is additionally configured to relay the debug data associated with the process from the proxy widget to the debug widget to provide web-based integration of testing and debugging on the browser while the process is running on the server.

A further exemplary embodiment is a computer program product for providing a web-based integrated test and debugging system. The computer program product includes a storage medium readable by a processing circuit and storing instructions for execution by the processing circuit for implementing a method. The method includes configuring a proxy widget on a server to communicate with a debug widget on a browser, and configuring the proxy widget to communicate with an IDE external to the server. The method also includes running a process on the server associated with one or more process-control widgets on the browser. The method additionally includes polling the IDE via the proxy widget to access a debug and test infrastructure of the IDE for debug data associated with the process, and relaying the debug data associated with the process from the proxy widget to the debug widget to provide web-based integration of testing and debugging on the browser while the process is running on the server.

Additional features and advantages are realized through the techniques of the present invention. Other embodiments and aspects of the invention are described in detail herein and are considered a part of the claimed invention. For a better understanding of the invention with the advantages and the features, refer to the description and to the drawings.

BRIEF DESCRIPTION OF THE SEVERAL VIEWS OF THE DRAWINGS

The subject matter which is regarded as the invention is particularly pointed out and distinctly claimed in the claims at the conclusion of the specification. The forgoing and other features, and advantages of the invention are apparent from the following detailed description taken in conjunction with the accompanying drawings in which:

The detailed description explains the preferred embodiments of the invention, together with advantages and features, by way of example with reference to the drawings.

DETAILED DESCRIPTION

Exemplary embodiments provide a web-based integrated test and debugging system using a proxy to combine data and functionality of different widgets in a Rich Internet Application (RIA). Debug widgets can be mixed with other RIA widgets to create mash-ups that support both interactions with processes and testing of the processes. The debug widgets running in a browser communicate with proxy widgets to enable communications to pass through a server and be redirected to another environment, such as an Integrated Development Environment (IDE), while maintaining security constraints with respect to the server. With access to additional functionality and data, more complex mash-ups can be created to support hybrid widgets and RIAs. The proxy widgets may support a variety of communication protocols to establish direct and indirect communications between browser based widgets and remote applications. For example, proxy widgets can communicate through application program interfaces (APIs) to access functionality and data of remote applications.

Figure 1:
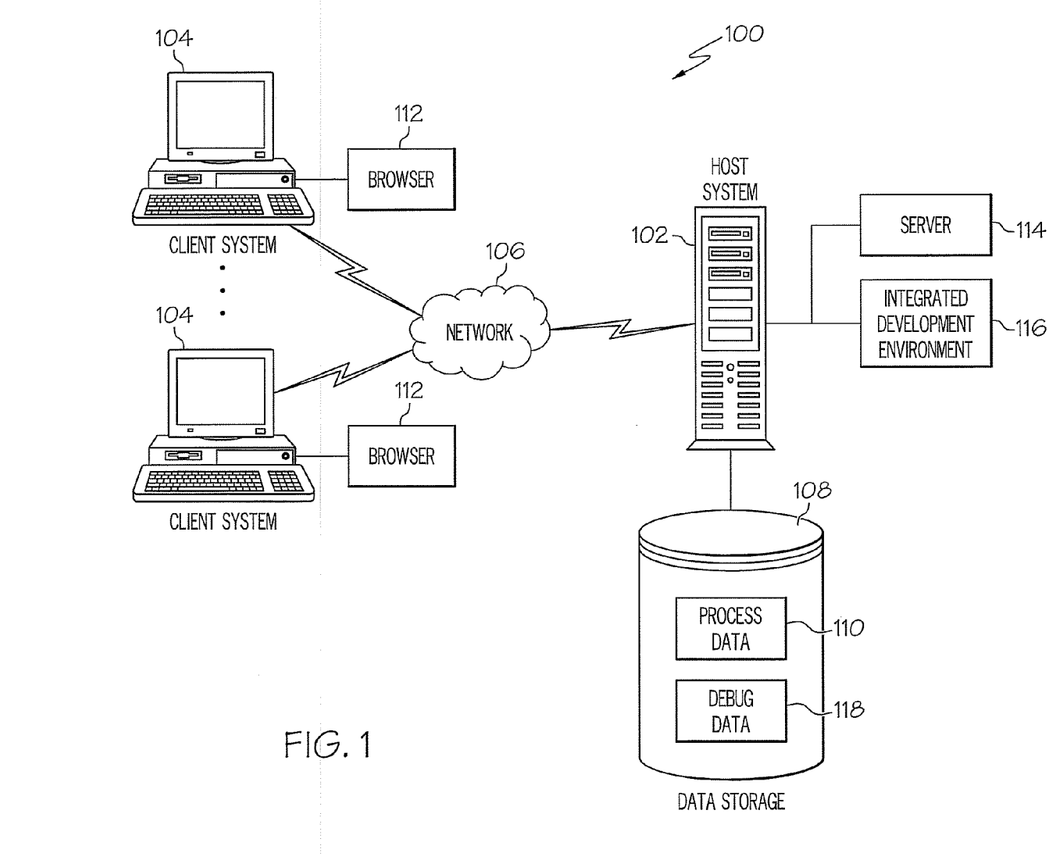
FIG. 1 depicts a block diagram illustrating an exemplary computer processing system that may be utilized to implement exemplary embodiments of the present invention.

Turning now to the drawings, it will be seen that in FIG. 1 there is a block diagram of a system 100 upon which web-based integrated testing and debugging is implemented in exemplary embodiments. The system 100 of FIG. 1 includes a host system 102 in communication with client systems 104 over a network 106. In exemplary embodiments, the host system 102 is a high-speed processing device (e.g., a mainframe computer, a desktop computer, a laptop computer, or the like) including at least one processing circuit (e.g., a CPU) capable of reading and executing instructions, and handling numerous interaction requests from the client systems 104 as a shared physical resource. For example, the host system 102 may enable the client systems 104 to access data storage device 108 in communication with the host system 102. The data storage device 108 may hold process data 110 that a user can interact with using a browser 112 executing on one or more of the client systems 104.

In an exemplary embodiment, the host system 102 includes a server 114 that provides web services and content to browsers 112, where the server 114 executes a runtime environment supporting interaction with multiple browsers 112. The host system 102 can also run other applications, such as an integrated development environment (IDE) 116. The IDE 116 may store and access debug data 118 on the data storage device 108 for application development and debugging.

In exemplary embodiments, the client systems 104 comprise desktop, laptop, general-purpose computer devices, and/or networked devices with processing circuits and I/O interfaces, such as a keyboard and display device (e.g., web-enabled phones or handheld devices). The host system 102 and client systems 104 can include various computer hardware and software technology known in the art, such as one or more processing units or circuits, volatile and non-volatile memory including removable media, power supplies, network interfaces, support circuitry, operating systems, and the like. Users can initiate various tasks locally on the client systems 104, such as interacting with widgets through the browsers 112 to access direct content or mash-ups from the server 114. Browsers 112 can access web pages or components and execute hypertext transfer protocol (HTTP)-enabled content. The HTTP-enabled content may include secure HTTP, such as HTTP over a secure socket layer (HTTPS). The browsers 112 may support other communication or transfer protocols known in the art.

The network 106 may be any type of communications network known in the art. For example, the network 106 may be an intranet, extranet, or an internetwork, such as the Internet, or a combination thereof. The network 106 can include wireless, wired, and/or fiber optic links. Additional computer systems (not depicted) can also be accessed via the network 106 or other networks. The host system 102 may also represent a cluster of computer systems collectively performing processes as described in greater detail herein.

The data storage device 108 refers to any type of computer readable storage medium and may comprise a secondary storage element, e.g., hard disk drive (HDD), tape, or a storage subsystem that is internal or external to the host system 102. Types of data that may be stored in the data storage device 108 include, for example, various files and databases. It will be understood that the data storage device 108 shown in FIG. 1 is provided for purposes of simplification and ease of explanation and is not to be construed as limiting in scope. To the contrary, there may be multiple data storage devices 108 utilized by the host system 102.

Figure 2:
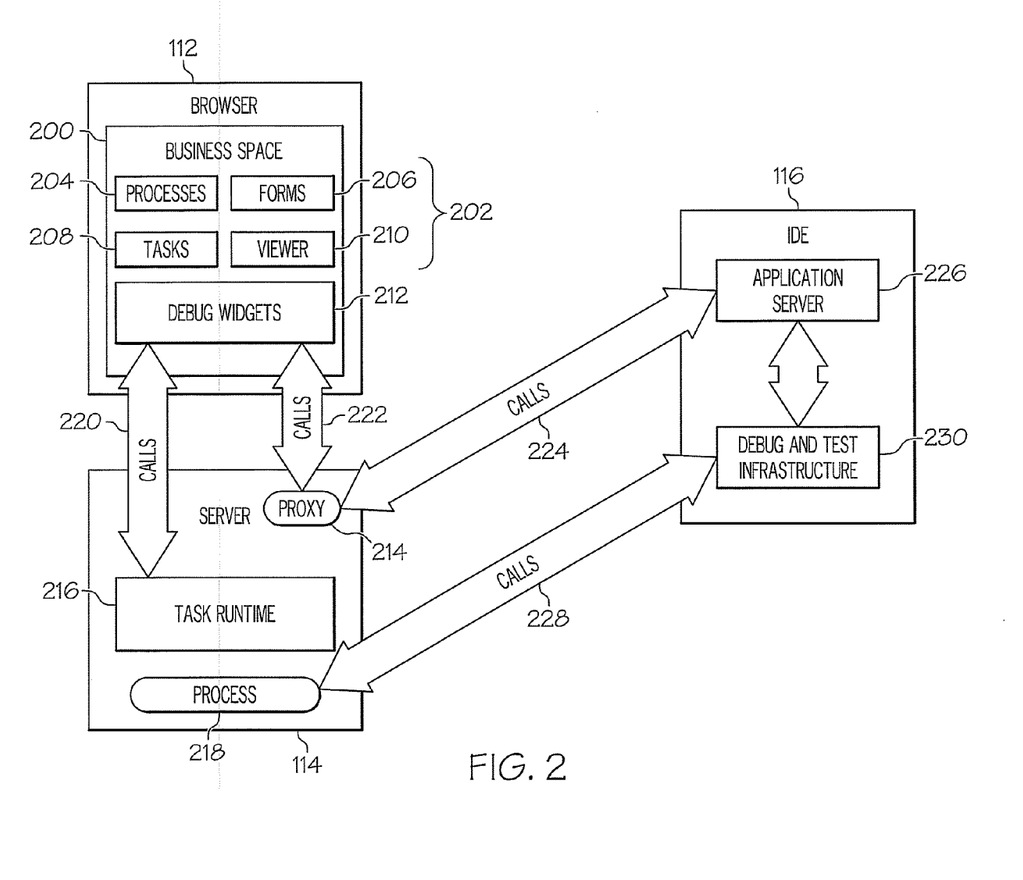
FIG. 2 depicts an example of browser, server, and integrated development environment interactions in accordance with exemplary embodiments.

FIG. 2 depicts an example of interactions between browser 112, server 114, and IDE 116. In the example of FIG. 2, the browser 112 interacts with a business space container 200 holding a number of process-control widgets 202 executed by the browser 112, including process widgets 204, form widgets 206, task widgets 208, and viewer widgets 210. The business space container 200 also includes debug widgets 212. The server 114 acts as a web server with respect to the browser 112 and serves the browser 112 with the widgets 204-212 of business space container 200 as in one or more web pages. The server 114 may execute a proxy widget 214, a task runtime 216, and a process 218. The task runtime 216 is an executable that can interface with the process-control widgets 202 to perform server-side business processes, including process 218. The process 218 may be executed by the task runtime 216, and, executed in part by other components in the server 114. The process 218 interacts with the process data 110 of FIG. 1 to determine a sequence of tasks to perform, store form data, access history data, and control the flow of process steps.

Communication between the browser 112 and the server 114 can be achieved using a variety of calls at different levels. For example, the task runtime 216 and task widgets 208 communicate via calls 220, while debug widgets 212 and proxy widget 214 communicate via calls 222. The calls 220 and 222 may comply with various communication standards known in the art, such as Representational State Transfer (REST) calls. The proxy widget 214 and the process 218 on the server 114 can also communicate with various components of the IDE 116. For example, the proxy widget 214 makes calls 224 to an application server 226 of the IDE 116. The process 218 handles calls 228 from a debug and test infrastructure 230 of the IDE 116. In exemplary embodiments, the calls 224 use a higher-level protocol, such as REST calls, while the calls 228 use a lower-level protocol, such as API calls. A REST call is an example of a service invocation typical of the collection of technologies generally referred to as "Web 2.0". Asynchronous JavaScript and XML (AJAX) is another example of a protocol that can be supported in exemplary embodiments.

The business space container 200 is an example of an interface to an RIA with the process data 110 of FIG. 1 sourced from the server 114 and debug data 118 sourced indirectly from the IDE 116 via the proxy widget 214. Application testing and debugging can appear seamless to the user of the browser 112, because the debug functions are mashed-up with the process-control widgets 202 to provide process functions. The process widgets 204 can manage the flow of business activities. The forms 206 may include interactive elements for inputting information in support of business processes. The task widgets 208 provide a number of tasks to perform, such as human tasks that request interactions from the user of the browser 112. The viewer widgets 210 support monitoring and interactive viewing of processes and tasks that are actively running. Other widgets (not depicted) can be used to support presentation and tracking information, such as history widgets. The various widgets of FIG. 2 can be implemented as individual widgets, may be combined, or further subdivided within the scope of the invention.

The debug widgets 212 incorporate functions of the IDE 116, such as those provided by the debug and test infrastructure 230, into other widgets in the browser 112. The process-control widgets 202 communicate with server 114 to obtain process data 110 and/or to initiate business functions, while the debug widgets 212 communicate with IDE 116 to leverage the debug capabilities that are provided by the IDE 116. The process-control widgets 202 can obtain data and state information from the server 114 through standard web protocols using calls 220.

To provide debugging capabilities, one or more debug widgets 212 are mashed-up with one or more of the process-control widgets 202. The debug widgets 212 communicate with the application server 226 embedded in the IDE 116. The debug widgets 212 can also use REST calls (or related Web 2.0 communication technologies) as the calls 222, but the calls 222 are relayed to the IDE 116 as calls 224 rather than being directly serviced by the server 114. The proxy widget 214 embedded in the server 114 handles redirection of the calls 222 and 224 between the debug widgets 212 and the IDE 116. The call redirection enables indirect communication, since the debug widgets 212 cannot directly communicate with the IDE 116. The widgets 204-212 are loaded into the browser 112 as part of the business space container 200 served from the server 114. The widgets 204-212 may be programmed using JavaSript, ActionScript, or a similar browser scripting language. Widely adopted browser security policies do not permit scripts that are loaded from one server to callout to another server, such as calling out the application server 226 from widgets served from server 114. Therefore, the proxy widget 214 acts as an intermediary between the browser 112 and the IDE 116. The proxy widget 214 redirects calls from the debug widgets 212 to the application server 226.

The debugging widgets 212 provide additional information to the user of browser 112 about the operation of a business process, as well as controlling the execution of the process (such as process 218) by pausing, setting breakpoints, changing data, and other typical debugging operations. The debug widgets 212 further enable a visually depiction of the process 218 being debugged with debugging information. Business processes that are running can be observed visually using a combination of the widgets 204-212. For example, the viewer widgets 210 can display information about process 218 executing on server 114. The debug widgets 212 can access debug information about the internal state of the process 218, and the debug information can be added to the visual display produced by the viewer widgets 210 as status information or animation to illustrate what is happening as the process 218 executes. Thus, the resulting visual depiction becomes an integral part of the debugging experience.

Figure 3:
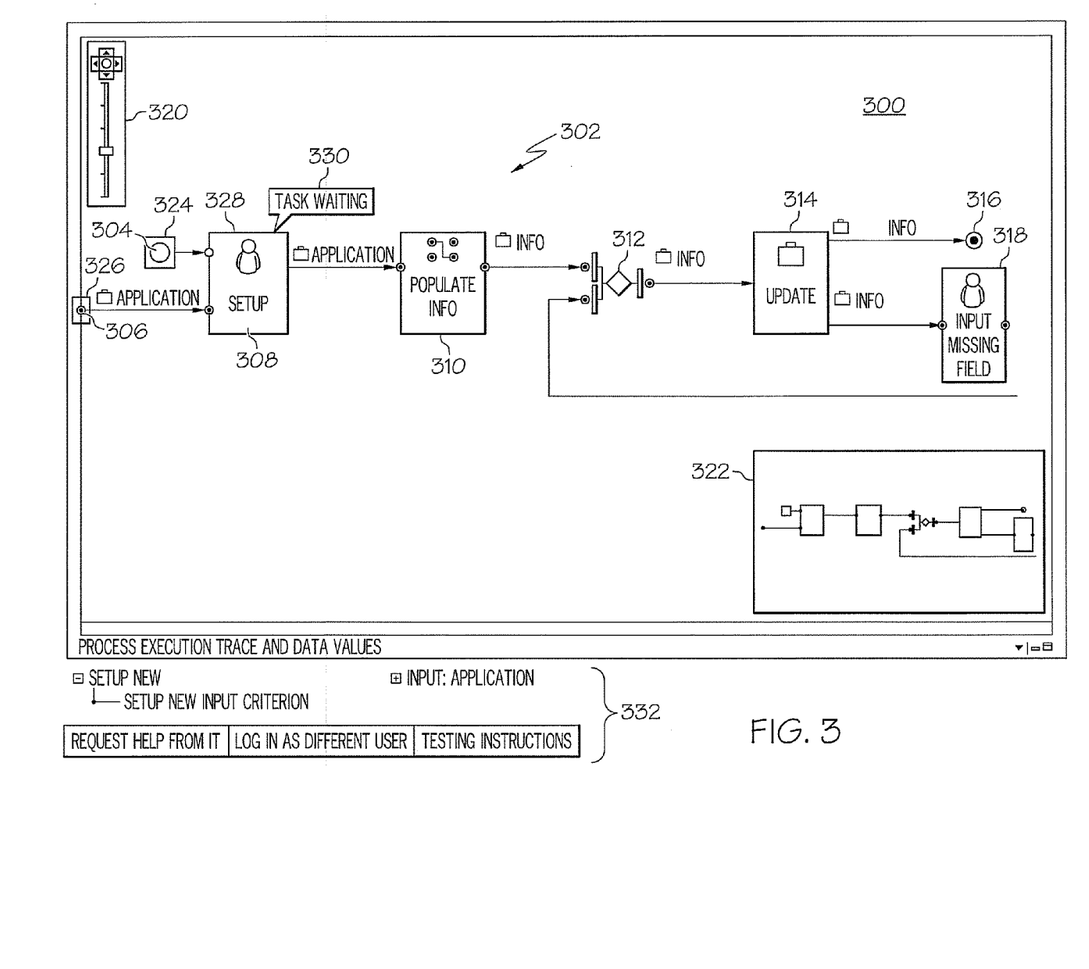
FIG. 3 depicts an example of a user interface for interacting with a mash-up of business process and debug widgets in accordance with exemplary embodiments.

FIG. 3 depicts an example of a user interface 300 for interacting with a mash-up of process-control widgets 202 and debug widgets 212. The example of FIG. 3 is an embodiment of the process 218 of FIG. 2 that has been deployed, and has been invoked. The viewer widgets 210 of FIG. 2 show a picture of the deployed version of process 218, whereas debug widgets 212 show a trace of the executing process 218, and the combination appears as visual process 302. Process data 110 and debug data 118 associated with an execution point in the process 218 can also be displayed through the user interface 300 as part of the visual process 302. The viewer widgets 210 can interface with the process widgets 204 to display multiple process steps graphically and the task widgets 208 to display multiple tasks of the process 218. The debug widgets 212 provide trace information to the viewer widgets 210 to show historical and current execution point information integrated in the visual process 302 while process 218 is actively executing. Within the browser 212, the user can "click" on previous trace entries and observe the visual process 302 highlighted based on debug data gathered by the debug widgets 212.

The visual process 302 includes process entry points 304 and 306 that provide inputs to a setup task 308. The setup task 308 outputs application data to a populate information block 310. The populate information block 310 feeds information to a decision block 312, which in turn outputs information to an update process block 314. The update process block 314 outputs information to a process exit point 316 and to an input missing field task 318, which in turn provides feedback to the decision block 312. The viewer widgets 210 provide a visual interface to display static information about the process widgets 204 and task widgets 208 associated with the process 218. The viewer widgets 210 can also provide a variety of visual navigation assistance features, such as zoom controls 320 and magnification viewer 322.

To provide active information associated with execution of the process 218, the debug widgets 212 initiate calls 222 through the proxy widget 214, which in turn makes calls 224 to the application server 226 of the IDE 116. Requests for state information about the process 218 are passed through the test and debug infrastructure 230 to the process 218 as calls 228. The process data 110 and the debug data 118 of FIG. 1 can be used to develop a source map to translate low-level debugging events to higher-level business processing events. The translation is done as each low-level event is received and prepared for presentation to the user. Not all low-level runtime events are shown to the user, only events with direct high-level semantics are presented.

The debugging widgets 212 can provide tracing and status information to the viewer widgets 210 to overlay on the visual process 302. For example, trace highlighting 324 and 326 on process entry points 304 and 306 provide visual indicators of execution history. Interconnecting wires of the visual process 302 may also be highlighted as part of the tracing. Tracing can also include indicating a current event in the visual process 302 using current event highlighting 328, which is associated with setup task 308 in the example of FIG. 3. Additional debugging status information can also be added to the visual process 302 as annotations based on debug data received at the debugging widgets 212. As illustrated in FIG. 3, a status bubble 330 is added as an annotation to the visual process 302 so the user knows what is happening during the execution of the process 218. The debugging widgets 212 instruct the viewer widgets 210 to place the status bubble 330 above the setup task 308 in response to receiving a "human task awaiting action" event through the IDE 116 as the process 218 is queried by the debug and test infrastructure 230 using calls 228. Widget-to-widget communication can be accomplished with JavaScript and other standard web-based technologies.

As the operation of the process 218 continues, the most recent event is highlighted on the visual process 302 while monitoring and debugging of the underlying process 218 proceeds. Further features to support debugging can also be included as part of the user interface 300, for instance, buttons to pause the process 218, and to modify data at the pause point. Breakpoints can also be established via requests through the debug widgets 212, with graphical breakpoints inserted per instructions sent to the viewer widgets 210. Additional inputs 332 can be used to configure process execution trace and data values, as well as access external functions.

The debug widgets 212 maintain a live view of the operation of the process 218 on the visual process 302 using the proxy widget 214 to poll the IDE 116 via the application server 226, which in turn communicates with the running process 218 through the debug and test infrastructure 230. The debug widgets 212 can also automatically initiate refreshing of various widgets associated with the visual process 302 to keep the displayed information and trace information up to date as execution of the process 218 advances. Polling for updated state information is performed via the proxy widget 214. The IDE 116 can use existing debugging technologies to communicate with the task runtime 216, to execute pause and step commands, and to retrieve and modify data. Thus, debugging functionality can be mashed-up in the browser 212, while reusing existing technologies in the IDE 116.

Figure 4:
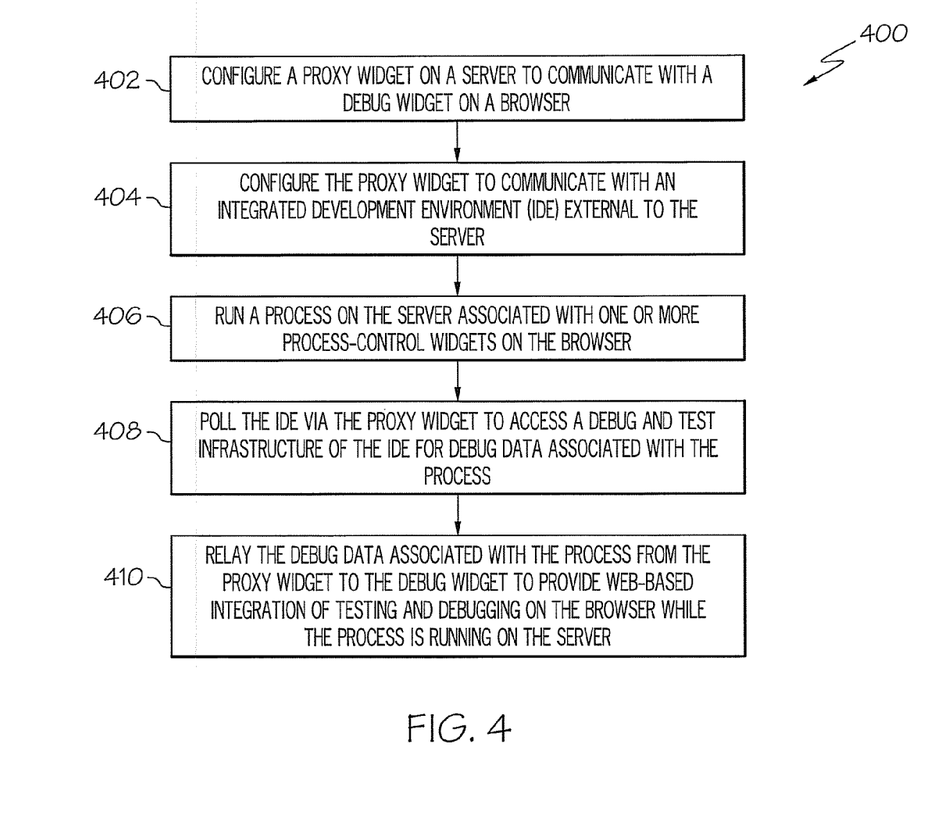
FIG. 4 depicts an exemplary process for providing a web-based integrated test and debugging system in accordance with exemplary embodiments.

Turning now to FIG. 4, a process 400 for providing a web-based integrated test and debugging system will now be described in accordance with exemplary embodiments, and in reference to FIGS. 1-3. At block 402, proxy widget 214 is configured on server 114 to communicate with debug widgets 212 on browser 112. At block 404, the proxy widget 214 is configured to communicate with IDE 116, which is external to the server 114, although both the IDE 116 and server 114 can execute independently on host system 102.

At block 406, process 218 runs on the server 114. The process 218 is associated with one or more process-control widgets 202 on the browser 112, such as process widgets 204, form widgets 206, task widgets 208, and viewer widgets 210 in business space container 200. The one or more process-control widgets 202 communicate directly with the server 114 without use of the proxy widget 214. The one or more process-control widgets 202 and the debug widgets 212 may be served as a web page from the server 114 to the browser 112 for execution on the browser 112. The browser 112 supports a widget mash-up to combine data and functionality from the IDE 116 via the debug widgets 212 with the one or more process-control widgets 202 sourced from the server 114. At block 408, the proxy widget 214 polls the IDE 116 to access debug and test infrastructure 230 of the IDE for debug data 118 associated with process 218. The polling initiates calls from the proxy widget 214 to the debug and test infrastructure 230 via application server 226 of the IDE 116.

At block 410, the proxy widget 214 relays the debug data 118 associated with the process 218 to the debug widgets 212 to provide web-based integration of testing and debugging on the browser 112 while the process 218 is running on the server 114. Separate high-level calls 220, 222, and 224 are supported between the one or more process-control widgets 202 and the server 114, between the debug widgets 212 and the proxy widget 214, and between the proxy widget 214 and the IDE 116. Calls 228 between the IDE 116 and the process 218 running on the server 114 may be supported using a low-level API.

In an exemplary embodiment, a source map is used to translate low-level debugging events to higher-level processing events to support integration between the debug widgets 212 and the one or more process-control widgets 202. The debug widgets 212 are configured to instruct the one or more process-control widgets 202 on placement of debug status information on visual process 302 representing the process 218 running on the server 114 in response to receiving the debug data 118 associated with the process 218. The placement of debug status information includes highlighting trace information with current event highlighting and status annotation as depicted in the example of FIG. 3. The debug widgets 212 are further configured to refresh a widget of the one or more process-control widgets 202 to keep displayed information and trace information up to date as execution of the process 218 advances.

The capabilities of the present invention can be implemented in software, firmware, hardware or some combination thereof.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

Technical effects include providing web-based integrated testing and debugging with other widgets as part of a Rich Internet Application. Server side proxy widgets enable widgets on client browsers to access other application servers that would not otherwise be directly available to the client browsers. The proxy widgets may support a variety of protocols, including high-level calls and low-level API calls to remote applications. Thus, a common user interface and experience can be delivered on the client side browser to interact with business processes and initiate testing and debugging of the business processes as a mash-up. This can speed development and debugging of new and existing processes.

The diagrams depicted herein are just examples. There may be many variations to these diagrams or the steps (or operations) described therein without departing from the spirit of the invention. For instance, the steps may be performed in a differing order, or steps may be added, deleted or modified. All of these variations are considered a part of the claimed invention.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated. Moreover, the use of the terms first, second, etc. do not denote any order or importance, but rather the terms first, second, etc. are used to distinguish one element from another.

What is claimed is:

1. A computer-implemented method for providing a web-based integrated test and debugging system, comprising:
   configuring a proxy widget on a server to communicate with a debug widget on a browser;
   configuring the proxy widget to communicate with an integrated development environment (IDE) external to the server;
   running a process on the server associated with one or more process-control widgets on the browser;
   polling the IDE via the proxy widget to access a debug and test infrastructure of the IDE for debug data associated with the process; and
   relaying the debug data associated with the process from the proxy widget to the debug widget to provide web-based integration of testing and debugging on the browser while the process is running on the server.

2. The method of claim 1 wherein the one or more process-control widgets communicate directly with the server without use of the proxy widget.

3. The method of claim 1 wherein the polling initiates calls from the proxy widget to the debug and test infrastructure via an application server of the IDE.

4. The method of claim 1 further comprising:
   serving the one or more process-control widgets and the debug widget in a container as a web page from the server to the browser for execution on the browser.

5. The method of claim 1 wherein the browser supports a widget mash-up to combine data and functionality from the IDE via the debug widget with the one or more process-control widgets sourced from the server.

6. The method of claim 1 wherein separate high-level calls are supported between the one or more process-control widgets and the server, between the debug widget and the proxy widget, and between the proxy widget and the IDE, and further wherein calls between the IDE and the process running on the server are supported using a low-level application programming interface (API).

7. The method of claim 1 further comprising:
using a source map to translate low-level debugging events to higher-level processing events to support integration between the debug widget and the one or more process-control widgets.

8. A system for web-based integrated testing and debugging, comprising:
a host system comprising a processing circuit in communication with a data storage device configured to store process data; and
a server configured to execute upon the host system and perform a method comprising:
deploying a debug widget to a browser, the debug widget configured to communicate with one or more process-control widgets on the browser as a mash-up;
running a process on the server associated with the one or more process-control widgets on the browser, wherein the process accesses the process data;
executing a proxy widget at the server to communicate with the debug widget and an integrated development environment (IDE) external to the server, wherein the proxy widget polls the IDE to access a debug and test infrastructure of the IDE for debug data associated with the process; and
relaying the debug data associated with the process from the proxy widget to the debug widget to provide web-based integration of testing and debugging on the browser while the process is running on the server.

9. The system of claim 8 wherein the one or more process-control widgets communicate directly with the server without use of the proxy widget.

10. The system of claim 8 wherein the polling initiates calls from the proxy widget to the debug and test infrastructure via an application server of the IDE.

11. The system of claim 8 wherein separate high-level calls are supported between the one or more process-control widgets and the server, between the debug widget and the proxy widget, and between the proxy widget and the IDE, and further wherein calls between the IDE and the process running on the server are supported using a low-level application programming interface (API).

12. The system of claim 8 further comprising a source map to translate low-level debugging events to higher-level processing events to support integration between the debug widget and the one or more process-control widgets.

13. The system of claim 8 wherein the debug widget is configured to instruct the one or more process-control widgets on placement of debug status information on a visual process representing the process running on the server in response to receiving the debug data associated with the process.

14. The system of claim 13 wherein the placement of debug status information further comprises highlighting trace information including current event highlighting and status annotation.

15. The system of claim 13 wherein the debug widget is further configured to refresh a widget of the one or more process-control widgets to keep displayed information and trace information up to date as execution of the process advances.

16. A computer program product for providing a web-based integrated test and debugging system, the computer program product comprising:
a storage medium readable by a processing circuit and storing instructions for execution by the processing circuit for implementing a method, the method comprising:
configuring a proxy widget on a server to communicate with a debug widget on a browser;
configuring the proxy widget to communicate with an integrated development environment (IDE) external to the server;
running a process on the server associated with one or more process-control widgets on the browser;
polling the IDE via the proxy widget to access a debug and test infrastructure of the IDE for debug data associated with the process; and
relaying the debug data associated with the process from the proxy widget to the debug widget to provide web-based integration of testing and debugging on the browser while the process is running on the server.

17. The computer program product of claim 16 wherein the one or more process-control widgets communicate directly with the server without use of the proxy widget.

18. The computer program product of claim 16 wherein the polling initiates calls from the proxy widget to the debug and test infrastructure via an application server of the IDE.

19. The computer program product of claim 18 wherein the browser supports a widget mash-up to combine data and functionality from the IDE via the debug widget with the one or more process-control widgets sourced from the server.

20. The computer program product of claim 18 wherein separate high-level calls are supported between the one or more process-control widgets and the server, between the debug widget and the proxy widget, and between the proxy widget and the IDE, and further wherein calls between the IDE and the process running on the server are supported using a low-level application programming interface (API).

* * * * *